DIGITAL CODE EXTRACTOR

Filed July 18, 1966 6 Sheets-Sheet 1

Serge Mikailoff
Georges Peronneau
Félix Floret
Inventors

BY:

Karl G. Ross
Attorney

Serge Mikailoff
Georges Peronneau
Félix Floret
Inventors.
BY:
Karl F. Ross
Attorney Serge Mikailoff
Georges Peronneau
Félix Floret
Inventors.
BY:
Karl F. Ross
Attorney Serge Mikailoff
Georges Peronneau
Félix Floret
Inventors.
BY:
Karl F. Ross
Attorney Serge Mikailoff
Georges Peronneau
Félix Floret
Inventors.
BY:
Karl G. Ross
Attorney Serge Mikailoff
Georges Peronneau
Félix Floret
Inventors.
BY: Karl G. Ross
Attorney 3,466,614

DIGITAL CODE EXTRACTOR

Serge Mikailoff, Paris, Georges Peronneau, La Celle Saint Cloud, and Félix Floret, Sainte Genevieve-des-Bois, France, assignors to Thomson Infomatique & Visualisation T.I.V., Paris, France, a corporation of France Filed July 18, 1966, Ser. No. 566,038
Claims priority, application France, Aug. 12, 1965, 28,119
Int. Cl. G06f 7/00
U.S. Cl. 340—172.5 19 Claims

ABSTRACT OF THE DISCLOSURE

A digital-code extractor used in a secondary radar system has two or more parallel channels to which incoming code pulses may be selectively directed under the control of an analyzing network (2) which generates, in response to an initial code pulse of a first code group (C), a first train of sampling pulses (E), with a repetition period equaling that of the code pulses and substantially in phase therewith, as well as a second train of sampling pulses (E′) with the same repetition period but interspersed with the first pulse train, subsequently arriving code pulses being compared with these sampling pulses and being directed to one channel (I) upon substantially registering with pulses (E) of the first train, indicating their inclusion in the first code group (C), or to another channel (II) upon substantially registering with pulses (E′) of the second train, indicating that they form part of a second code group (C′ or C″) received in interleaved relationship with the first code group. If the pulse positions of the two code groups overlap, the resulting merged pulses are directed to the first channel but a garbling signal is generated to tag the extracted information as being due to such merger; similar tagging of the first code group (C) occurs in the first channel (I) if a second code group (C′) is being concurrently processed in the other channel (II), interleaved code groups (C, C″) in both channels being so tagged in the presence of a third code group (C′) overlapping the two other code groups.

This invention relates to apparatus for processing digitally coded information, and one of its main objects is the provision of an improved code-extractor system capable of handling comparably coded signals forthcoming from different sources not in phase with one another and hence liable to interfere with one another and to cause garbling of the received signals.

The invention was developed in connection with secondary radar systems, and will accordingly be disclosed with particular reference to such systems, although it is to be understood that its range of utility is not restricted thereto but may extend to other applications in the field of digital-information processing.

So-called secondary radar monitoring systems (also known as air-traffic-control radar-beacon systems) have come into extensive use in recent years for controlling the heavy traffic of incoming aircraft over large airfields. Such systems serve to impart information to the ground control stations concerning each incoming craft about to land, over and above the sparse data given by the more conventional, so-called primary radar equipment. In a secondary radar system, the aircraft are equipped with transponder beacons. When such an airborne transponder is illuminated by a radar beam from the group-station interrogator, it retransmits a reply in the form of a digital code train which conveys certain specified items of intelligence concerning the carrier aircraft, including identification, altitude and other data. The code used is a multi-positional code, and ICAO (International Civil Aviation Organization) recommendations specify a thirteen-position code group with one pulse position blank, capable of carrying $2^{12}=4096$ information bits. The code trains received at the ground station are passed from the receiver by way of a so-called code-extractor unit to a decoded unit, and the decoder information is displayed and used to perform control functions. The extractor unit just referred to (to which this invention particularly relates) serves to detect and to separate useful received code response from accompanying noise and garbling response, and to pass them in a readily usable form to the decoder unit.

The chief source of garbling in connection with secondary-radar response signals is the fact that two or more transponder-beacon-carrying aircraft may be located simultaneously within the scanning field of a common radar beam. In such a situation, the aircraft will usually be located at substantially different distances from the interrogating radar station. Depending on the relationship between the distances of the respective aircraft and the keying rate of the code pulses and code groups, the responses transmitted back from the two aircraft may be received at the ground station so that the respective responses are distinctly separated or are more or less intermingled. In the latter event information may be lost, and it is a function of code extractors of the class to which this invention relates to minimize such loss of information caused by mutual garbling or response signals from different aircraft.

In commonly owned co-pending patent application Ser. No. 526,437, filed by us jointly with Paul L. Roman on Feb. 10, 1966, now U.S. Patent No. 3,357,016, there is disclosed a code-extractor system for the purpose just indicated, and the present invention can be regarded as an improved or simplified version of that earlier code extractor. The system of this invention is able to perform most of the functions of the earlier system while being considerably simpler.

It is an object of this invention to provide, in a code extractor of the specified type, means for receiving multi-positional code groups that are randomly phased with respect to one another, e.g. because they are received from sources located at different distances from the receiver, and means for effectively segregating such out-of-phase code groups between different processing channels of the system, provided the received code groups are in an "interleaved" relation, that is, their relative phasing is such that the pulse positions of the respective code groups are internested yet substantially separate from one another or present but little overlap. Another object is to provide in such a system a primary processing channel and at least one secondary channel, and selectively to direct an initially received code pulse as well as subsequent code pulses forming part of the same code group as the initial pulse into the primary channel, while directing into the secondary channel code pulses received subsequently to said initial pulse and forming part of another code group in interleaved relationship with the first code group. A further object, in such a system, is to provide garble-analyzing logic adapted to sense various garbling situations that may affect a code group present in a processing channel, and on sensing such a situation to combine with the code group present in the channel a predetermined signal constituting a label indicating that said code group is garbled. A further object is to provide improved two-stage storage means in the processing channels of a code extractor of the type specified, whereby different code groups simultaneously present therein can be separately tagged with "garble" labels, while reducing the total processing time to a minimum. Other objects and features will appear.

An exemplary embodiment of the invention will now be described with reference to the accompanying drawing wherein:

FIG. 1 is a representation of the standard secondary-radar response code group as specified by current ICAO regulations;

FIGS. 2, 3 and 4 schematically illustrate three different relative configurations in which a pair of sequentially received code groups may present themselves at the secondary-radar receiver;

FIGS. 5 and 6 are diagrams using a larger time scale than the preceding ones, and illustrating in finer detail two relative configurations in which the pulse positions of a pair of code groups, occurring in the overlapping relationship shown in FIG. 4, are liable to be involved; specifically FIG. 5 shows a so-called "interleaved" configuration whereas FIG. 6 shows a "phase-garbled" or "pulse-overlap" configuration;

Figure 1:
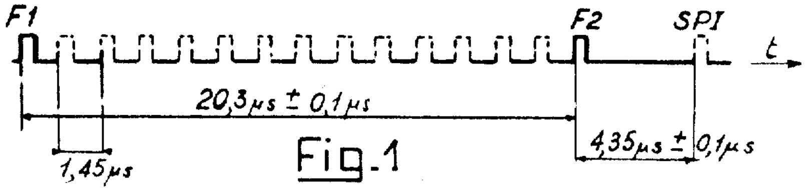

The standard response code group (FIG. 1)

A standard aircraft transponder signal or pulse code group as specified by ICAO regulations currently in force is illustrated in FIG 1. It comprises fifteen pulse positions with a recurrence period of 1.45 μs. and is thus $1.45\times14=20.3$ μs. long. The two end pulses designated F1 and F2 are always present and are known as the framing or bracket pulses. Intermediate pulse positions are filled or are vacant as required by the coded intelligence to be conveyed, with the seventh (middle) pulse position, however, always being blank in civilian radar use. The total number of possible codes is thus seen to be $2^{12}=4096$. The pulse width may vary from one transponder to another by $\pm0.10$ μs. around 0.45 μs., within the range 0.35 μs. to 0.55 μs. Positioned three pulse periods or 4.35 μs. beyond the end framing pulse F2 there may be a so-called "Special Identification Pulse," or SPI, introducible manually by the aircraft operator. The permitted tolerance in respect to the timing of each pulse relative to the leading edge of the F1 framing pulse is $\pm0.10$ μs. Thus, the timing of the leading edge of the $n$th pulse of the code group as referred to the leading edge of the F1 pulse is $(n\times1.45)$ μs. $\pm0.10$ μs.

As the radar beam from an interrogating ground station scans a section of the sky it will receive response code groups from any aircraft transponder present. Depending on the relative distances of the responding airplanes from the ground station, the response code groups from them may be received in various relative configurations, some of which may cause garbling. This will now be considered in detail.

The garbling configurations (FIGS. 2–6)

Figure 2:
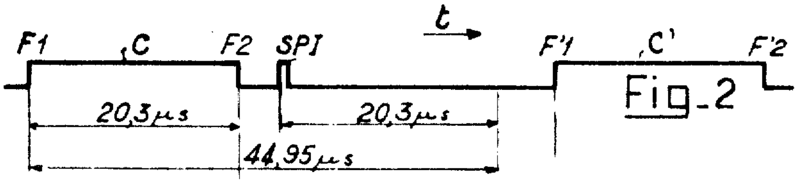

According to FIG. 2, when two code groups C and C' from different aircraft are received so that the start framing pulse F'1 of code C' is received more than 20.3 μs. after the SPI position of code C, that is, more than 44.95 μs. after the F1 framing pulse of C, the two received code groups are said to be isolated, and there is then no possibility of garbling.

Figure 3:
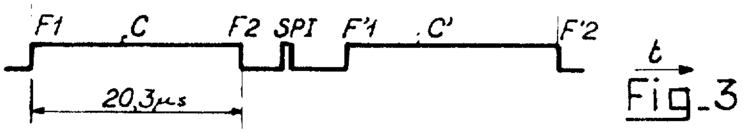

In FIG. 3, code C' is shown to be received so that its framing pulse F'1 occurs more than 24.65 μs. but not more than 44.95 μs. after the framing pulse F1 of code C. The code groups in such configuration may be said to be separate, as distinct from isolated. A possibility of garbling exists in that there may well be a pair of pulses, respectively forming part of code group C and code group C', which are 20.3 μs. apart and might therefore be mistaken for the framing pulses of a code group; thus the system would be liable to detect a spurious code group. The code extractor of the invention, to be described herein, includes means for preventing such spurious code identification.

Figure 4:
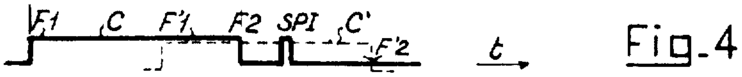

In FIG. 4, the two code groups C and C' are shown to be received in group-overlapping relation, that is, the interval F1F'1 between the start framing pulses of the two codes is less than 24.65 μs. In such a situation garbling is necessarily present, and such garbling may assume either of the two forms shown in FIGS. 5 and 6.

Figure 5:
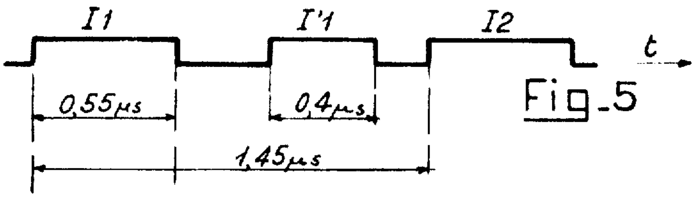

FIG. 5 shows, on a time scale larger than that used in FIGS. 2–4, two consecutive pulses of code C, designated I1 and I2, with leading edges separated by the standard keying interval of 1.45 μs., and a pulse I'1 forming part of the overlapping code group C', the latter pulse being shown positioned intermediate the pulses I1 and I2 and separate (or disjunct) from each. This garble configuration of the response code groups C and C' is here termed "interleaving" (the same term was used in the earlier copending application identified above).

The code extractor of this invention, as will be presently described, operates to direct all received code pulses (such as I2) forming part of the same code group (C) as the initially received pulse (I1) into a so-called "Primary" processing channel, and to direct any pulses such as I'1, received subsequently to the initial pulse I1 and forming part of a different code group (C'), into a different, so-called secondary, processing channel. At the same time the code group (C) present in the primary channel is labeled with a "garble" indication by means of the Garble Analyzer logic.

Figure 6:
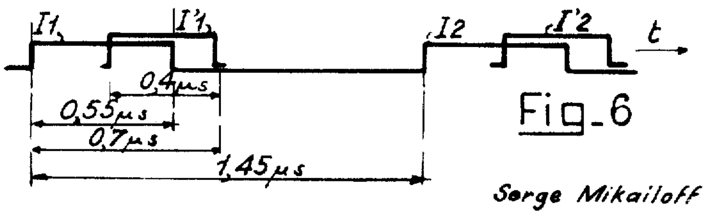

FIG. 6 illustrates another possible garble configuration liable to arise in the case of the group-overlapping situation of FIG. 4. In this case, overlap is present between the individual pulses such as I'1, I'2 of code group C' and the individual pulses such as I1, I2 of code group C. This garble configuration was referred to in the above-identified earlier application and patent as "phase-garbling," and may alternatively be designated "pulse-overlap."

As will be later described with reference especially to FIG. 10, the extractor system of our present invention, in order to segregate two response code groups occurring in the "group-overlapping" relationship of FIG. 4, produces two trains of sampling, or phase-memory, pulses called E and E' each at the same keying rate as that of the code pulses, the two trains being mutually phase-displaced by approximately one-half the keying interval, as shown in the second and third graphs of FIG. 10. The initial sampling pulse of the E train is produced substantially in time coincidence with the initially received code pulse applied to the system input at the start of an operating cycle. Subsequently received code pulses are tested for coincidence with either the E pulses or the E' pulses, and are directed into the primary or the secondary channel in accordance with the result of the test.

In view of this operating principle, subsequent references to the pulse-overlap configuration shown in FIG. 6 will be understood to have the following significance: In cases where the degree of pulse overlap is relatively small, that is, if the width of the resulting merged pulse constituted by the overlapping pulses such as I1 and I'1 of the respective codes C and C' is large enough, then an initial portion of the I1 pulse and an end portion of the I'1 pulse can partly coincide with the respective sampling pulses E and E', and in such cases the code pulses of the respective code groups C and C' may still be directed into the respective channels and thus be effectively separated by the system. If, however, the degree of overlap is relatively large so that the resulting merged pulse is quite short, effective separation is no longer possible. In the former event, the code groups can still be considered as being, in effect, in the "interleaved" relationship described with reference to FIG. 5, while in the latter case the code groups are in a true phase-garbling or pulse-overlapping relaitonship. In the ensuing description and the claims, the terms "interleaved" and "pulse-overlapping" (or "phase garbled") should be interpreted in this broadened sense.

The conditions just outlined will now be examined in somewhat greater detail. In FIG. 6, typical pulse widths have been shown for illustrative purposes as being 0.55 μs. (the upper limit of the tolerance range) for pulse I1, and 0.4 μs. (nearly the nominal width) for pulse I'1. The two pulses are shown overlapping to such an extent that the resulting merged pulse is 0.7 μs. wide. In assessing the maximum overlap, or the minimum width of the resulting merged pulse, for which effective and reliable separation of the two code groups is still possible, it is necessary to take into account both the ±0.10 μs. tolerance on the timing of the leading edge of each pulse position in the code group the ±0.10 μs. tolerance on the width of each pulse. On account of the timing tolerances, the direction of overlap between pulses of the respective code groups may actually reverse from one pulse position to another so that, for example, whereas pulse I1 is shown in leading relation to pulse I'1, subsequent pulses such as I2 and I'2 of the code groups C and C' considered in FIG. 6 may be disposed with pulse I'2 leading and I2 lagging. In such a situation it is obvious that the phase test by means of the E and E' sampling pulses referred to above would lead to an erroneous result, and no effective separation could be otbained. Furthermore, account must also be taken of so-called "jitter," which is an uncontrollable variation in the response timing of a given transponder from one response code group to the next. Jitter is considered as introducing an additional ±0.10 μs. uncertainty on the positioning of the leading edges of the code pulses. Allowing for all of the above variations, it can be seen that the minimum width of the composite pulse produced by overlapping code pulses, for which effective sampling and code separation can still be achieved, is 0.75 μs., this value being the sum of the maximum permitted width of a code pulse, i.e. 0.55 μs., plus two 0.1 μs. periods of uncertainty. Thus, in the pulse-overlapping configuration shown in FIG. 6, the code groups may be considered as effectively "interleaved" or truly "phase garbled," depending on whether the width of the composite pulses is substantially greater or substantially less than 0.7 μs.

The sampling pulse trains E and E' are arranged, as will be described in detail, to sample the two halves, each about 0.7 μs. long of the 1.45 μs. keying interval, in order to ensure effective and reliable code separation in the the greatest possible number of circumstances.

Figure 7:
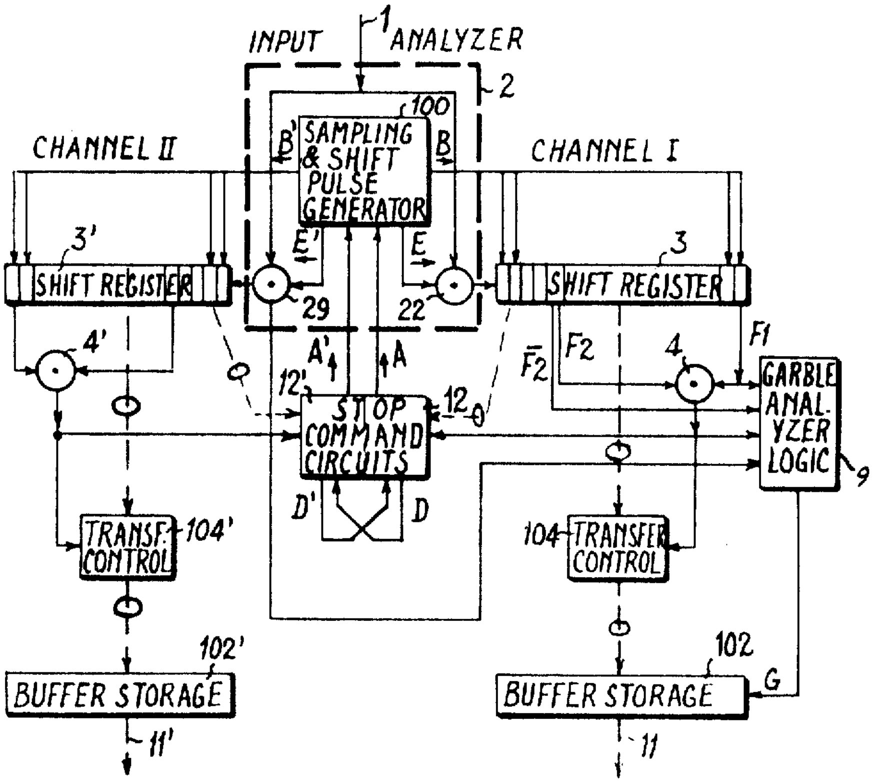
FIG. 7 is a general block diagram of a code-extractor system according to the invention.

Brief system description (FIG. 7)

The system is seen to include an Input Analyzer unit 2 followed by two signal-processing channels I and II in parallel. Incoming response pulses derived from a radar receiver, not shown are applied to the input 1 of input analyzer 2 and are selectively directed thereby into one or the other of the two channels.

The input-analyzer unit 2 operates broadly as follows in order to perform its selective directing function. On reception of an initial code pulse at input 1, the pulse is directed into Channel I. Subsequently received code pulses, if their timing is substantially such as to indicate that they all form part of the same response code group as said initial pulse, are also directed into Channel I. However, should a response pulse be received at input 1 subsequently to said initial code pulse in out-of-phase relationship with the response code group headed by said initial pulse, then this out-of-phase pulse is directed into Channel II, and all following pulses so timed as to indicate that they form part of the same response code group as said first out-of-phase pulse are likewise directed into Channel II. In this way code groups received in out-of-phase or interleaved relation from different sources are segregated between the two channels I and II.

To perform this selective directing function, Input Analyzer 2 is shown as including a sampling or phase-memory pulse-generating circuit generally designated 100. Circuit 100 is triggered by the reception of an initial pulse at input 1 to generate two sampling (or phase-memory) pulse trains called E and E'. In each of these trains the sampling pulses have the same repetition rate as the prescribed keying rate of the response code pulses (herein 1.45 μs.). The sampling pulses E are timed to extend substantially over the first fourth of the keying interval (1.45 μs.) as defined by the initially received code pulse, while the sampling pulses E' are timed to extend over (and somewhat overlay) the third fourth of said keying interval. This relative timing of the sampling or phase-memory pulses E and E' will be readily understood from FIG. 10, in which the top graph indicates two consecutive response pulses of a received code group C, having the keying interval 1.45 μs., the two pulses shown being the initial framing pulse F1 and the first-digital-position pulse I1. The second graph of the figure shows the first two pulses of the sampling or phase-memory pulse train E, each of which is seen to coincide substantially with the first fourth (about 0.36 μs.) of the keying period (1.45 μs.). The third graph shows the first two pulses of the second sampling or phase-memory pulse train E', each of which is seen to commence somewhat before the midpoint of the keying period and to end somewhat beyond the termination of the third fourth of the keying period. The precise time relationships are indicated in the figure and will be discussed in detail later.

With the relative timing described, it will be understood that any received code pulse that forms part of the same code group as the first-received framing pulse F1, such as the code pulse shown at I1, is in part coextensive with a pulse of the first sampling train E, but has no part coinciding with any pulse of the second sampling train E'. On the other hand, a code pulse received after the initially received pulse F1 and out-of-phase therewith, such as the pulse F'1 (bottom line) forming part of a response code group C' in interleaved relationship with code group C, is at least in part coextensive with a pulse of the second sampling train E'.

The Input Analyzer 2 includes two coincidence gates 22 and 29, each of which has a first input connected to the input line 1, and has a second input connected to receive the sampling pulse train E or E′ respectively, from phase-memory-pulse generator 100. The gate 22 is consequently enabled by the E pulses to pass all code pulses pertaining to the same code group (such as C) as the initially received code pulse, whereas the gate 29 is enabled by the E′ sampling pulses to pass out-of-phase code pulses pertaining to another code group (such as C′), should any be received.

The outputs of coincidence gates 22 and 29 of the Input Analyzer unit 2 are connected to the inputs of respective shift registers 3 and 3′, which form part of the signal-processing channels I and II. Each processing channel has as its broad function to accept a code group passed to it in serial form from the Input Analyzer 2 into Shift Register 3 (or 3′), and then to transfer the complete code group in parallel from the Shift Register to a buffer storage arrangement, generally designated 102 (or 102′), where the code group is stored for a prescribed time. During this time, a Garble Analyzer unit 9 senses certain logical conditions in the system to determine whether or not the code group received in the Primary Channel I is garbled and, if so, then to enter a garble signal (G) into the buffer storage 102 of said channel, whereby the code group stored therein becomes "tagged" with the indication that it is garbled. At the end of the storage period, the code group in buffer storage 102, as well as the code group, if any, stored in buffer storage 102′ of the Secondary Channel, is transferred through means not shown by way of the outputs 11 and 11′ to a decoder unit that forms no part of this invention and in which the contents of the code groups may be decoded for subsequent display and exploitation in a generally conventional manner.

It may already at this time be noted that no "Garble" tag need be associated with a code group stored in the buffer storage 102′ of the Secondary Channel (II), since such a code group, if present, is necessarily in a garbled situation.

We shall now describe the operations just outlined in somewhat greater detail. The Shift Registers 3 and 3′ are supplied with shift pulses, designated B and B′ respectively, which are generated by the unit 100 of the Input Analyzer 2. The shift-pulse trains B and B′ have the same keying rate (1.45 $\mu$s.) as the response code pulses and the phase-memory pulses E and E′, and are phased in a predetermined relationship with respect to the respective phase-memory pulses, as will be later described. The pulses introduced into each Shift Register 3, 3′ from the associated Input Gate 22, 29 are shifted down the stages of the register by the action of the shift pulses, in a conventional manner. Two stages of each Shift Register, spaced fourteen pulse positions apart so that the start and end framing pulses F1 and F2 of a true response code group present in the register will be simultaneously contained in these respective stages at a certain point in the shifting process, have their outputs connected to the two inputs of a respective coincidence gate 4, 4′, as shown. Energization of the output of this coincidence gate therefore indicates that a true response code is completely contained in the Shift Register. The output of coincidence gate 4, 4′ is applied to a parallel-transfer-control arrangement, generally designated 104, 104′, to cause the contents of the Shift Register 3, 3′ to be transferred bodily into the associated buffer storage 102, 102′. The time during which the code group is retained in the buffer storage is determined by counting means later described, not shown in FIG. 7. The Garble Analyzer unit 9 has a first pair of inputs connected to the output of the F1 stage of Shift Register 3 and to the complementary ($\overline{F2}$) output of the F2 stage of the same Shift Register; a third input is connected to the output of coincidence gate 4; and a fourth input is connected to the output of the Input Gate 29 associated with the Secondary Channel II in the Input Analyzer unit 2. From the information applied through these four inputs, logical circuitry later described in the Garble Analyze derives a conclusion as to whether or not the code group present in buffer storage 102 is garbled, and issues or withholds the garble signal G accordingly.

Stop Command units 12 and 12′ receive the outputs from the respective coincidence gates 4 and 4′. Logical circuitry in units 12 and 12′ issues a Stop signal A and A′, respectively, on sensing a coincidence between the framing pulses F1 and F2 of a code group present in the associated Shift Register 3 or 3′, if the other Shift Register (3′ or 3) is empty at the time, or on sensng that both these multistage registers have been emptied of their contents after having failed to sense such coincidence (this last situation being indicative of a truncated or mutilated code group in either Shift Register). Issuance of an A or an A′ command arrests the operation of Sampling- and Shift-Pulse Generator 100.

The system will now be described in greater detail.

Figure 8:
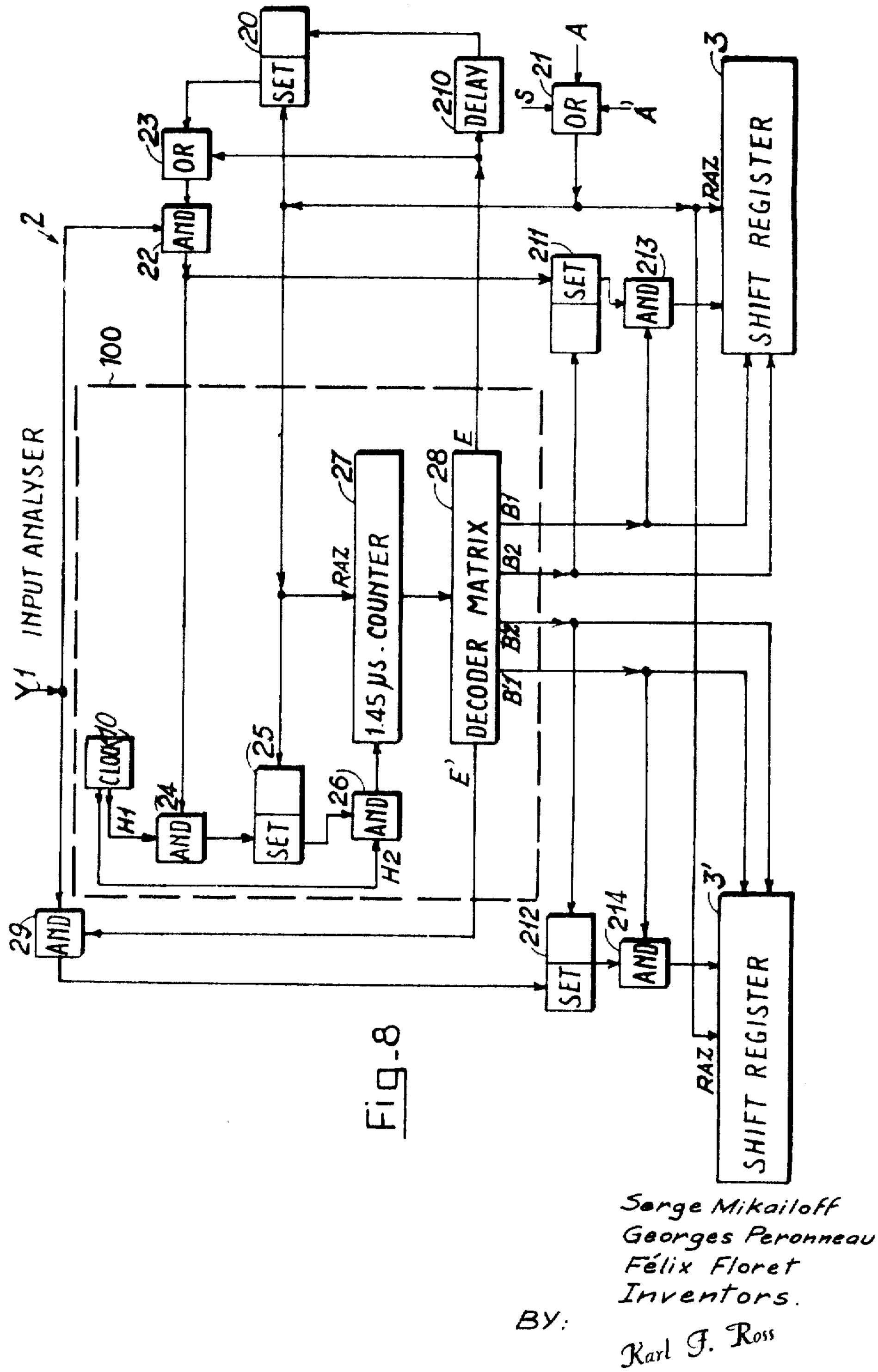
FIG. 8 is a block diagram of the Input Analyzer unit of FIG. 7.

The input-analyzer unit 2 (FIG. 8)

The Phase-Memory and Shift-Pulse Generator circuit generally designated 100 in FIG. 7 is seen in FIG. 8 to comprise a digital counter 27 and an associated decoder matrix 28, together with means feeding clock pulses from a clock or synchronizing unit 10 to the input of counter 27. Clock generator 10 continuously delivers fine clock pulses which in this embodiment have a repetition rate of about 0.09 $\mu$s. (more precisely 1.45/16 $\mu$s.), thus a cadence considerably higher than the repetition period of sampling pulses E and E′, and may be any suitable crystal-oscillator arrangement. The clock pulses issue from clock generator 10 in two separate trains, H1 and H2, at the identical keying rate just indicated but with the H2 pulses being in phase-lagging relation to the H1 pulses. The H2 pulses are applied to the input of counter 27 by way of a control circuit including an AND-gate 26 which at its other input receives the "set" output of a binary 25. The setting input of binary 25 is derived from an AND-gate 24 which is supplied at one input with the H1 pulses from clock generator 10 and has its other, enabling, input connected to the output of the Primary Input Gate 22 previously referred to. Gate 22 has one input connected to the system input line 1 and has its second input connected to the output of an OR-gate 23, one input of which is connected to receive the previously mentioned E sampling pulses from counter 28. The other input of OR-gate 23 is connected to the set output of a binary 20 having its setting input connected to the output of an OR-gate 21. This OR-gate has inputs connected to receive the A and A′ Stop signals from the Stop Command unit 12 earlier referred to, and has another input connected to receive the usual synchronizing signal S which is generated by the transmitter section (not shown) of any secondary radar system on transmission of an interrogation code. The output of OR-gate 21, apart from presetting the binary element of flip-flop 20, also serves to reset the binary 25 and to clear both shift registers 3 and 3′ as well as the counter 27, as indicated by the connections designated RAZ ("Remise à zéro"). As so far described the Input Analyzer circuit operates as follows.

When the radar transmitter (not shown) begins transmitting interrogation codes to a target being monitored, the sync signal S from the transmitter is passed by OR-gate 21 to set the binary 20 and reset the binary 25. This action, as will presently appear, ensures that the initial response code pulse from the target will be directed by Input Analyzer unit 2 into the Shift Register 3 of Primary Channel I rather than into the Shift Register 3′ of the Secondary Channel.

The set output from binary 20 is applied through OR-gate 23 to the enabling input of AND-gate 22. Thereafter, should a response code pulse be received at system input 1, this pulse will be passed by the enabled Input AND-gate 22 to the enabling input of AND-gate 24. The incoming pulse is not passed through the other Input-AND-gate 29 since the latter is not enabled at this time. AND-gate 24 is therefore enabled for the duration of the incoming pulse, and passes H1 clock pulses from generator 10 for a corresponding period of time. The first of the H1 pulses sets binary 25, which delivers a set output that enables AND-gate 26. This gate thereupon passes H2 clock pulses from generator 10 into digital counter 27 for counting therein.

Figure 9:
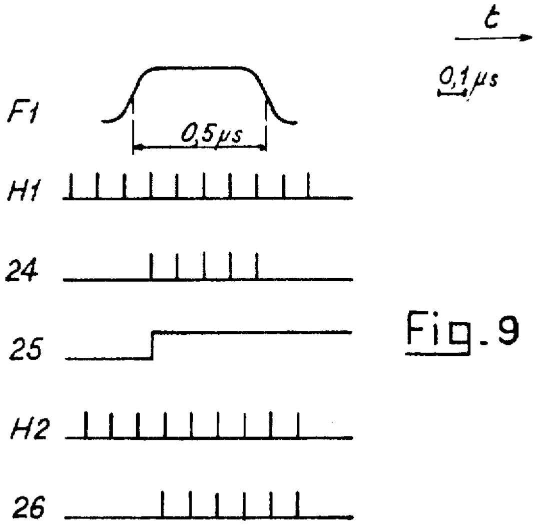
FIG. 9 is a series of time charts explaining the manner in which the sampling-pulse-generating counter of FIG. 8 is triggered into operation by an initially received code pulse appearing at the input of the system.

This operation is elucidated in FIG. 9 where the top graph represents an incoming code pulse, indicated by way of example as being 0.50 μs. wide, applied through Input AND-gate 22 to AND-gate 24. The second graph shows the train of H1 clock pulses, at the aforementioned repetition rate of about 0.09 μs. and of very narrow width, issuing from clock generator 10. The third graph shows the output of AND-gate 24 as comprising a small number (herein five) of clock pulses H1 passed during the enabled period of the gate. The fourth graph shows the set output of binary 25, which is energized by the first of the passed H1 pulses. The fifth graph shows the train of H2 clock pulses as they issue from source 10, in staggered relationship with the H1 pulses. The bottom graph of the figure indicates the train of H2 clock pulses entering the counter 27. The first one of these entered pulses is seen to coincide with the leading edge of the incident response core pulse F1 to within less than 0.1 μs. The phase lag of clock pulses H2 with respect to clock pulses H1 serves to prevent coincidence between the switchover of flip-flop 25 and the occurrence of the initial clock pulse applied to gate 26, as might otherwise occur, in which case AND-gate 26 might fail to detect such initial clock pulse, and counter 27 would miss a count.

Counter 27 is in this embodiment a four-stage binary counter having, consequently, a counting capacity of sixteen. It will be recalled that the recurrence period of clock pulses H1 and H2 is exactly $1.45/16 \approx 0.09$ μs. long. Hence the counter 27 will complete each full counting cycle of sixteen clock pulses H2 in exactly 1.45 μs. With counter 27 is associated a conventional decoding network, i.e. the aforementioned matrix 28, which in the usual way may comprise a set of AND-gates and OR-gates (not shown) interconnected with the counter's stage outputs so as to deliver certain pulses of precisely determined duration at precisely determined times during each counting cycle. The pulses produced by the matrix 28 include the sampling (or phase-memory) pulses E and E′ and the shift pulses B and B′. These output pulses will now be examined in detail.

Referring again to FIG. 10, it will be recalled that the E pulse extends substantially over the initial fourth of the 1.45 μs. code keying period, and that the E′ pulse encompasses and somewhat exceeds the third fourth of said keying period. More precisely, in a preferred practical embodiment, the E pulse extends over the first four elementary H2 clock-pulse counting periods of counter 27, from count 1 to count 4 inclusive, so that its length is about $4 \times 0.09 = 0.36$ μs. as indicated; and the E′ pulse extends over the six counting periods from count 8 to count 13 inclusive, so that it starts $7 \times 0.09 = 0.63$ μs. after the start of the code keying period and is $$6 \times 0.09 = 0.54$$

μs. long, also as indicated. The appropriateness of these time values for the purposes of the invention, when the system is used in conjunction with the standard aircraft-transponder codes as currently prescribed by both civil and military regulations, can be shown as follows.

Figure 10:
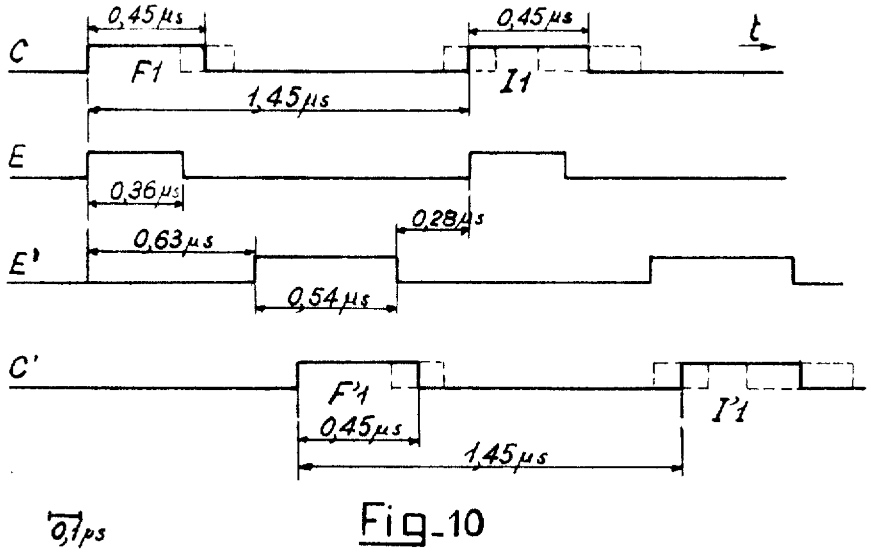
FIG. 10 illustrates the so-called phase-memory, or sampling, pulses E and E' produced in the Input Analyzer unit of the system, and their relationship with the pulse positions of two out-of-phase received code groups C and C'.

The initial framing pulse F1 shown for an incoming code C in FIG. 10 is required (as earlier stated) to have a width of 0.45 μs.±0.1 μs. The next pulse I1 of the response code, if present, also has the width 0.45 μs.±0.1 μs., and its leading edge is positions 1.45 μs.±0.1 μs. beyond the leading edge of the F1 pulse. As a result of the indicated tolerances, the trailing edge of the F1 pulse can vary in timing by ±0.1 μs. and the leading edge of I1 can vary in timing by the same amount, while the trailing edge of I1 is apt to vary by twice that amount, i.e. ±0.2 μs. The permissible variations in the timing of the pulse edges have been indicated in dotted lines in FIG. 10. The leading edge of the E pulse coincides with the start of the operating cycle of counter 27, and registers with the leading edge of the incident pulse F1 to within less than 0.1 μs. The width of said E pulse (0.36 μs.) substantially equals the minimum width tolerated for the code pulses ($0.45-0.1=0.35$ μs.).

The E′ pulse must be so positioned and dimensioned in time that an incoming code pulse of minimum tolerated width (0.35 μs.), regardless of its time of occurrence within the keying period of 1.45 μs., will present an overlap of at least 0.05 μs. with either one or the other of the two sampling pulses E, E′, in order that the coincidence can be detected by the input gates 22 and 29. For this purpose, it is necessary that the leading edge of the E′ pulse shall be positioned not more than 0.30 μs. after the trailing edge of the E pulse, i.e. not more than 0.66 μs. after the leading edge of said pulse. It is further desired that any incoming pulse forming part of the same code C as the initially received F1 pulse, such as the pulse shown at I1, shall in no case overlap and E′ pulse by more than 0.05 μs. even when such I1 pulse has the longest tolerated width. This requires that the leading edge of the E′ pulse be positioned not less than 0.60 μs. after the leading edge of the E pulse. It is seen that both these conditions are satisfied when the E′ pulse has its leading edge timed as shown. Similarly, the trailing edge of the E′ pulse should be positioned not more than 0.30 μs. ahead of the leading edge of the next E pulse, and not less than 0.20 μs. ahead of said leading edge, in order to prevent this sampling pulse from overlapping a code pulse such as I1. By making the E′ pulse 0.54 μs. wide as shown, these conditions are fulfilled.

With the E and E′ pulses timed as shown in FIG. 10, a response code such as C′ following the C, code in interleaved relation with it, will have its pulses sampled exclusively by the E′ sampling pulses, whereas the first-received C code will have its pulses sampled exclusively by the E pulses, regardless of any time variations within the prescribed tolerances. These sampling operations are respectively performed in the Input Gates 22 and 29 as earlier indicated and as will be described in greater detail later.

Figure 11:
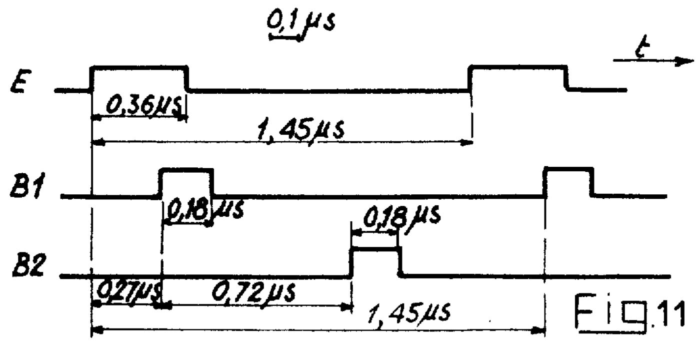
FIG. 11 shows the trains of shift pulses B1 and B2 produced in the Input Analyzer for application to the Primary-Channel Shift Register, and their relationship with the corresponding sampling-pulse train E.

The decoder matrix 28 also develops shift pulses for the Shift Registers 3 and 3′, which shift pulses were earlier designated B and B′ respectively. Actually, the Shift Registers 33 and 3′, in the embodiment being described, are of a conventional type in which each register stage comprises a pair of associated binaries actuated sequentially, and the shift pulses for each register accordingly constitute two pulse trains at equal keying rates and in phase-displaced relation, the pulses being designated B1 and B2 for Shift Register 3, and B′1 and B′2 for Shift Register 3′. FIG. 11 illustrates the timing of the B1 and B2 shift pulses in relation to the sampling pulses E. The B1 pulse is seen to extend over counting interval 3 and 4 of the operating cycle of counter 27 so that its leading edge occurs 0.27 μs. after that of the E pulse, and its width is 0.18 μs. The B2 pulse extends over counting intervals 11 and 12 so that its leading edge occurs 0.72 μs. after that of the B1 pulse and its width is also 0.18 μs. The timing of the B′1 and B′2 pulses in relation to the leading edge of sampling pulse E′ is the same as the timing of the B1 and B2 pulses in relation to the leading edge of the E pulse. The following table summarizes the timing of the sampling pulses E and E′ and shift pulses B1, B′1, B2 and B′2, within the operating cycle of counter 27, in the exemplary embodiment described. In this table,

*a*, *b*, *c*, *d*, represent the four binary stages of counter 27 in order of increasing digital weight.

COUNTER 27.—STAGES

| | a | b | c | d | Pulses | |
|---|---|---|---|---|---|---|
| Count Nr: | | | | | | |
| 1 | 0 | 0 | 0 | 0 | ------ | E |
| 2 | 1 | 0 | 0 | 0 | ------ | E |
| 3 | 0 | 1 | 0 | 0 | B'2 | E |
| 4 | 1 | 1 | 0 | 0 | B'2 | E |
| 5 | 0 | 0 | 1 | 0 | B1 | -- |
| 6 | 1 | 0 | 1 | 0 | ------ | -- |
| 7 | 0 | 1 | 1 | 0 | ------ | -- |
| 8 | 1 | 1 | 1 | 0 | ------ | E' |
| 9 | 0 | 0 | 0 | 1 | ------ | E' |
| 10 | 1 | 0 | 0 | 1 | B'1 | E' |
| 11 | 0 | 1 | 0 | 1 | B'1 | E' |
| 12 | 1 | 1 | 0 | 1 | B2 | E' |
| 13 | 0 | 0 | 1 | 1 | B2 | E' |
| 14 | 1 | 0 | 1 | 1 | ------ | -- |
| 15 | 0 | 1 | 1 | 1 | ------ | -- |
| 16 | 1 | 1 | 1 | 1 | ------ | -- |

The design of the logical circuitry in decoder matrix 28, in order to achieve the requisite timing of the pulses, will be readily deduced from the above table.

With reference again to FIG. 8, the E pulses from matrix 28 are applied through OR-gate 23 to Input Gate 22, and are also applied by way of a delay device 210 to the resetting input of binary 20. The E' pulses from matrix 28 are applied directly to the Input Gate 29. The outputs of the Input Gates 22, 29 are applied to the setting inputs of respective binaries 211, 212. The set outputs of these binaries are connected to first inputs of respective AND-gates 213, 214, receiving at their second inputs the B1 and B'1 shift pulses from matrix 28. The outputs of gates 212, 213 are fed as input pulses into the first stages of the associated shift registers. The B1 and B2 pulses are applied to the shift inputs of all stages of Register 3, and the B'1 and B'2 pulses are similarly applied to the shift inputs of Register 3'. Further, the B2 and B'2 pulses serve to reset the binaries 211 and 212.

To resume the description of operation of the Input Analyzer unit 2, it will be recalled that an initially received response code pulse, such as the Start pulse F1 of a response code C as shown in FIG. 10, was passed by Primary Input Gate 22 and, by way of the circuitry 24, 25, 26, has started the counter 27 to count H2 clock pulses so that matrix 28 now delivers the sampling and shift pulses as described above, all having their phases tied in precisely with the phase of the leading edge of the received F1 pulse. At the same time, the received F1 pulse passed by Primary Input Gate 22 sets the binary 211, so that its set output delivers a signal. This enables the first B1 pulse to be passed by AND-gate 213 into the first stage of register 3, whereupon the ensuing B1 and B2 shift pulses will cause the entered pulse to shift through the stages of the register, at the rate of one stage per 1.45 μs. code keying period. It will be seen that the function of binary 211 (and binary 212) is to take up the phase displacement present between the incoming code pulses and the shift pulses from matrix 28.

Let us assume first that no other response code, such as C', is received at input 1 from a different target that might be simultaneously present in the scan field of the radar antenna, so that the next pulse to be received at said input 1 will be a response code pulse such as I1 (FIG. 10). At this time binary 20 has been reset (by the initial E pulse through delay line 210). Nonetheless, the newly received I1 pulse is again passed through the Primary Input Gate 22, because its enabling input is now energized through OR-gate 23 by the second E pulse delivered from matrix 28 in time to coincide with said I1 pulse. The system will operate as described above to pass this I1 pulse into the initial stage of Primary Shift Register 3 and shift the pulse through the stages of the register at the rate of one stage per code keying period. Thus the successive code pulses that may be present at the pulse positions of the code C are all passed into Primary Shift Register 3 to be shifted therethrough in the proper sequence and at the proper rate.

It is now assumed that a second response code C', transmitted from a different target, is received at input 1 so that its code pulses are interleaved with the pulses of the response code C. The initial framing pulse F'1 of this second code is applied to Secondary Input Gate 29 in at least partial time coincidence with an E' sampling pulse from matrix 28, as earlier explained, and is hence passed by said gate to set binary 212. As described above for the Primary Shift Register, the pulse F'1, as well as subsequent code pulses such as I'1 in properly phased relationship therewith, are entered into Secondary Shift Register 3' and are shifted through the stages thereof by the B'1 and B'2 shift pulses.

Thus it will be seen that a pair of response codes, received from different targets in interleaved relationship, will be selectively directed by Input Analyzer unit 2 into the two signal-processing channels, with all the pulses of the first-received code being passed into Primary-Channel Shift Register 3 and all the pulses of the next-received code being passed into the Secondary-Channel Shift Register 3'.

The above type of operation, it will be understood, occurs only in the case of two received response codes whose pulses are in interleaved relationship, as earlier described with reference to FIGS. 5 and 6. Should the second-received code group have its pulses in true phase-garbled or fully overlapping relationship with the pulses of the first code group, as described with reference to FIG. 6, it will be apparent that the pulses of the second code would be directed by Input Analyzer unit 2 into the Primary-Channel Shift Register 3, together with the pulses of the first-received code group. In such a situation, the second or garbling code cannot be extracted. However, means will be described for correctly extracting the first-received code and sorting out its pulses from the pulses of the second, garbling code group.

Figure 12:
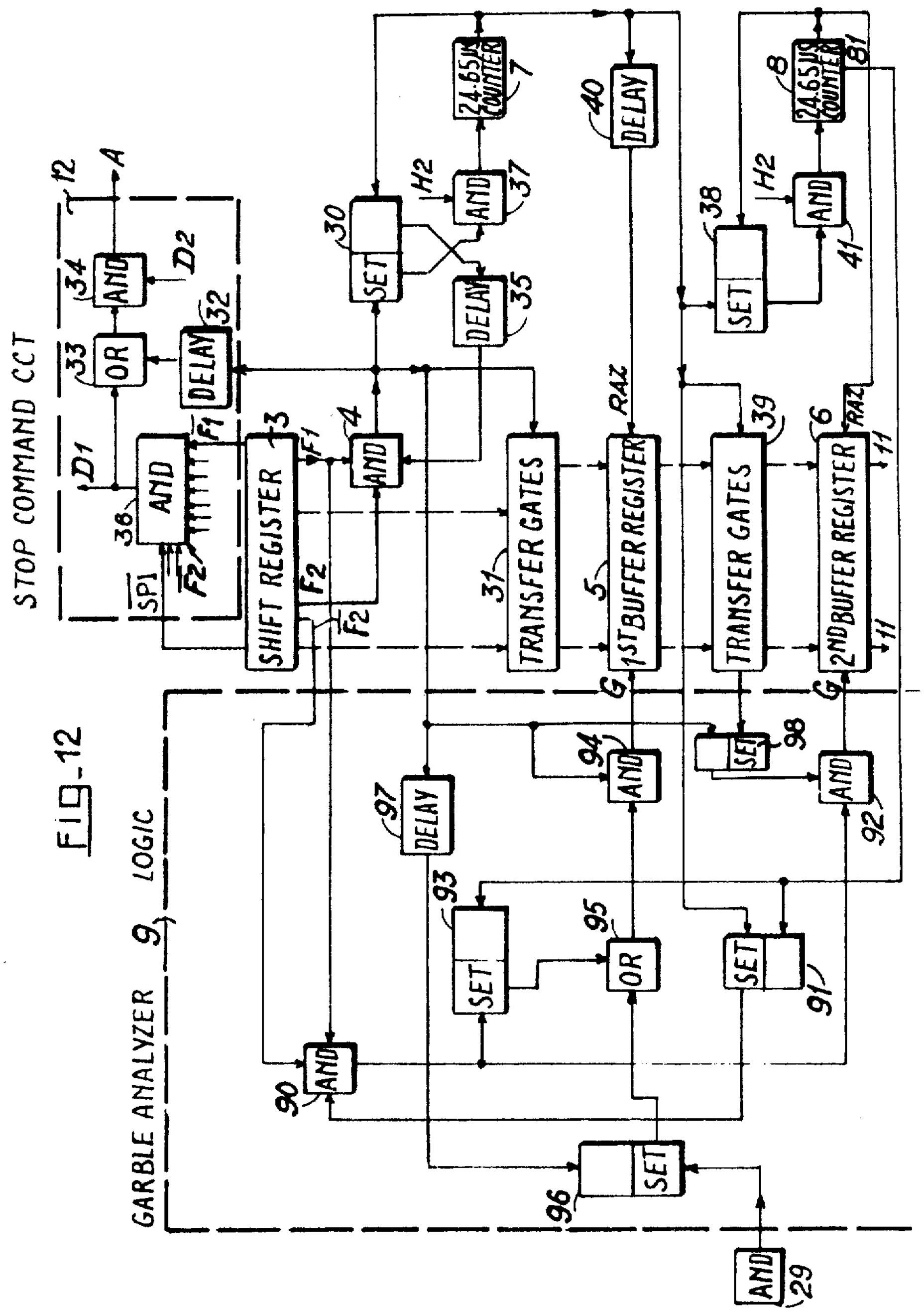
FIG. 12 is a block diagram illustrating in detail the Primary Channel of the system of FIG 7, together with the associated Stop-Command Circuit and the Garble Analyzer logic associated with said Primary Channel.

The signal-processing channels (FIG. 12)

The two channels being identical except as later pointed out, the following description will refer to the Primary Channel shown in FIG. 12. Shift Register 3 already referred to in the preceding section is, in the exemplary embodiment described, eighteen stages long, so that it is just able to contain the fifteen pulse positions of a response code group (including the framing pulses F1, F2) and the associated SPI pulse if any. The total shift time through the eighteen stages, at the rate of one stage per 1.45 μs, is 17×1.45=24.65 μs. The following output lines are shown connected to the shift register: An F1 output line, extending from the 18th stage, and F2 output line extending from the 4th stage, an $\overline{\mathbf{F2}}$ output line originating at the complementary binary output of said 4th stage, and an SPI output line emanating from the first stage of the register. As will be apparent, by the time a complete response code group has been shifted into the register so that the F1 (start) framing pulse has moved into the 18th stage, the F2 (end) framing pulse has moved into the 4th stage, and the SPI pulse, if any, into the first stage. Further, all of the stages of register 3 have their outputs connected in parallel to a Transfer Gate array 31 for parallel transfer of the register contents into the Buffer Storage, as earlier indicated and as presently described in detail. The parallel connections are omitted for clarity.

Coincidence gate 4 has two of its inputs connected to the F1 and F2 outputs of register 3 as earlier stated. The output of the gate is connected to the input of Transfer Gate array 31 and also to the setting input of a binary 30. Gate 4 has a third input connected by way of a delay circuit 35 to the reset output of binary 30. In the embodiment described, the Buffer Storage generally designated 102 in FIG. 7 is a memory consisting of two cascaded sections 5, 6 for reasons that will be made clear later. This memory includes a first buffer register 5, having its stage inputs connected to the outputs of respective transfer gates of array 31. A second buffer register 6, forming part of the same memory, has its stage inputs connected by way of a second array of transfer gates 39 to the stage outputs of first buffer register 5. It will be understood that each transfer-gate array 31 and 39 comprises a set of AND-gates each having an input connected to a related stage output of shift register 3 or buffer register 5, respectively, and an output connected to the related stage of buffer register 5 or second buffer register 6, respectively. Energization of the second inputs to all the AND-gates of the array, as later described, thus causes bodily transfer of the contents of one register into the other.

Initially, binary 30 is reset as will presently appear. Thus the coincidence gate 4, on sensing an F1·F2 coincidence, i.e. simultaneeous presence of a pulse in the 18th and 4th stages of Shift Register 3, produces an output that enables Transfer Gates 31 to pass the contents of the Shift Register 3 into First Buffer Register 5. The output of gate 4, further, is applied to Stop-Command Circuit 12, to deliver a Stop-Command A if the Secondary-Channel Shift Register 3′ is empty at the time, as will be later described in detail. A third action of the output AND-gate 4 serves to set the binary 30. The set output of this binary is applied to the enabling input of a gate 37, which thereupon begins to pass clock pulses H2 to a storage-time counter 7. This counter has a suitable number of stages, here 272, so that its counting cycle will be exactly 24.65 μs. long. On reaching the end of its count, counter 7 delivers an output signal which resets the binary 30, so that the feed of clock pulses to the counter is arrested. The output signal from counter 7 is also applied to the second array of transfer gates 39, so that the contents of the first buffer register 5 are transferred to the second buffer register 6 after being stored for 24.65 μs. in the first buffer register. This register is cleared, as indicated by the RAZ connection, by the output of counter 7 through delay network 40.

Simultaneously the output signal from first storage-time counter 7 is applied to the setting input of a binary 38, whereupon the set output of the latter binary enables an AND-gate 41 to pass H2 clock pulses into a second storage-time counter 8 similar to counter 7. On terminating its counting cycle 24.65 μs. later, counter 8 delivers a signal that resets binary 38 and clears second buffer register 6 through the RAZ line shown. As will appear later, the actual processing of a code group stored in Second Buffer Register 6 only requires 20.3 μs. Retaining the stored code group in register 6 for 24.65 μs., as described in connection with this embodiment, makes it possible to transfer the processed code group from this register into the decoder unit serially should this be desired. The decoding operations do not form part of the invention.

The Stop Command unit 12 will now be described. This circuit includes a delay network 32 which passes the output signal produced by coincidence gate 4, on the sensing of an F1·F2 coincidence, to an OR-gate 33 and thence on to an AND-gate 34. Unit 12 further includes a multiple-input coincidence gate 36 having its inputs connected to the respective complementary stage outputs of the Shift Register 3. The output from logical gate 36 therefore delivers a signal, designated D1, indicative of the vacant condition of Shift Register 3. This D1 signal is passed through OR-gate 33 to the first input of AND-gate 34. AND-gate 34 has a second input which is connected to receive a signal designated D2, indicative of the vacant state of Secondary-Channel Shift Register 3′, this signal D2 being derived from an AND-gate, not shown, similar to gate 36 and associated with Secondary Shift Register 3′. It is seen that the AND-gate 34 delivers a Stop Command signal A after detection of an F1·F2 coincidence, if the Secondary Shift Register 3′ does not contain any information. This A signal, as described with reference to FIG. 8, clears both Shift Registers 3, 3′ while also arresting the operation of Input-Analyzer Counter 27, so that the operation of the system is suspended.

Should the Secondary Shift Regishter 3′ contain information at the time of delivery of an output signal from gate 4 on detection of an F1·F2 coincidence in Shift Register 3, no A command is issued by gate 34. The stopping of the system may then be effected by an A stop-command signal issued by an AND-gate, not shown, similar to gate 34 and associated with Secondary Shift Register 3′, it being understood that the signals A and A′ are combined in the OR-gate 21 described with reference to FIG. 8. In the absence of both these command signals, therefore, the Shift Register 3 is not cleared after the response code has been completely entered into it, and the code continues to shift through the register stages. The possibility then arises that coincidence circuit 4 may sense a spurious F1·F2 coincidences due to the simultaneous presence of a pulse from the initially received code in the 18th stage of register 3 and a pulse from a later-arriving code group separate from the first one and received, as indicated in FIG. 3, less than 20.3 μs. thereafter. To avoid the resulting error, the gate 4 is disabled after having sensed a F1·F2 coincidence for a period of 24.65 μs. thereafter by providing it with a third input, as earlier described, which is enabled only after binary 30 is reset by counter 7.

Finally, a stop-command signal A is issued when D1 and D2 signals are simultaneously present at the inputs of AND-gate 34, indicating that both Shift Registers 3 and 3′ are devoid of information. This provides for the situation where mutilated code groups are present in both shift registers 3 and 3′; the system is then stopped after both registers have been emptied of the spurious information therein.

During the period of 49.30 μs. (twice 24.65 μs.) that the code group is being retained in the buffer registers 5 and 6, the Garble Analyzer unit 9 associated with the Primary Channel operates to sense any garble situations that may be affecting said code group and, should such a situation be sensed, to label the stored code group with a "garble" tag. This unit will now be described.

Garble-analyzer unit (FIG. 12)

This unit includes an AND-gate 90 having a first input connected to the direct F1 output of the 18th stage of Primary Shift Register 3, a second input connected to the complementary ($\overline{F2}$) output of the 4th stage of said register, and a third input connected to the set output of a switch in the form of a binary 91 whose setting input is connected to the direct F1 output of the 18th stage of Pri- 7. Binary 91 has its resetting input connected to an auxiliary output 81 of second storage-time counter 8, this output being energized at the 224th count of the counter, i.e. 20.3 μs. after the start of the counting cycle. The output of AND-gate 90 is applied through an AND-gate 92 to Second Buffer Register 6 so as to enter into a specially provided stage of that register an indication, such as a "1" bit (the "Garble tag"), indicating that the contents of the register are a garbled code group. This partial circuit operates as follows.

Figure 13:
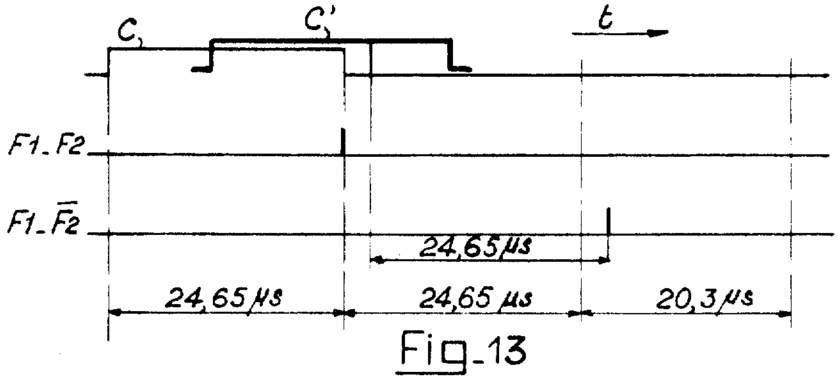
FIGS. 13 and 14 show phase-garbling configurations involving, respectively, two code groups and three code groups simultaneously directed into the Primary Channel.

The detection by gate 90 of a pulse in the 18th stage (F1) of Shift Register 3 together with the absence of a pulse in the 4th position ($\overline{F2}$) of the register, at a time more than 24.65 μs. after the detection of the last F1·F2 concidence in said register but less than 24.65+20.30=44.95 μs. after the last such coincidence, as indicated by the set state of binary 91, shows that the code group last processed in Shift Register 3 is followed by another code group in phase-garbling relationship therewith. This can be understood by a reference to FIG. 13.

This figure shows two overlapping code groups C and C′, it being assumed that code group C′ is in phase-garbling, rather than in interleaved, relationship with code group C as was described with reference to FIG. 6. Because of this relationship, code group C′ was spuriously directed by Input Analyzer 2 into the Primary Channel rather than into the Secondary Channel as would have been the case if code group C′ were interleaved with group C. The sensing of the F1·F2 coincidence in the first code C by concidence gate 4 fater the Start Pulse F1 thereof has entered the 18th stage of register 3, i.e. 24.65 μs. after said F1 pulse has first entered the register, results in the emission of an A Stop Command which resets the Shift Register 3 and stops the operation of the Input Analyzer counter 27 (this assumes that code C is not followed by a code group interleaved with it, in addition to the phase-garbling code group C′, which interleaved code group if present would be directed into the Secondary Channel).

In these circumstances, the first pulse of code group C′ to present itself at the system input 1 (after the SPI position of code group C) will again trigger the Input Analyzer unit into action, and will again be passed into Primary Shift Register 3. Subsequent pulses in code group C′ will also be passed into and shifted through the register, constituting a truncated or fore-shortened code group. When the first pulse of this truncated group reaches the 18th stage of the reigster, no pulse is simultaneously present at the 4th stage, and gate 90 accordingly detects a $F1 \cdot \overline{F2}$ concidence indicating that the pulse in stage 18 of register 3 is not a true F1 pulse, but merely the initial pulse of a truncated code group. It must be noted however that the sensing of a $F1 \cdot \overline{F2}$ coincidence will only indicate the initial pulse of a truncated code group if such coincidence occurs at least 24.65 μs. and at most 24.65+20.30 or 44.95 μs. after the last true F1·F2 coincidence was sensed. This is so because the initial pulse of a truncated code group arriving at stage 18 of the register may, in one extreme case, be a pulse in the C′ code located immediately adjacent to the SPI pulse of the C code at the instant the F1·F2 coincidence in the C code is sensed, in which case said C′ code pulse will reach the 18th register stage to create a $F1 \cdot \overline{F2}$ coincidence 24.65 μs. after said F1·F2 coincidence; and it may, in the opposite extreme case, be the end framing pulse F′2 of the C′ code, if this C′ code contains no intermediate pulses and if its F′1 pulse was overlapping the SPI pulse of the C code, in which case said C′ code pulse would reach the 18th register stage 24.65+20.3=44.95 μs. after the F1·F2 coincidence. This range of possibilities is taken care of by the provision of binary 91, in that it remains set during the requisite time interval, as described above.

Thus, the entering of a "garble" or G signal from AND-gate 90 through AND-gate 92 into the second buffer register 6 indicates that the code group currently stored in said register is garbled by another code group following it in phase-garbling relationship, i.e. with the pulse postions of the two code groups wholly or partly in coincidence.

The Garble Analyzer unit 9 further inludes a binary 93 having its setting input connected to the output of AND-gate 90 and its resetting input connected to the 20.3 μs. output line 81 of counter 8. The set output of binary 93 is connected through an OR-gate 95 with one input of an AND-gate 94 having its other input connected to the output of coincidence gate 4. The output of gate 94 is connected to First Buffer Register 5 for entering a garble (G) signal into a specially provided stage thereof to indicate the garbled state of the code group stored in said first register. The circuitry just described provides for the following garbling situation.

Figure 14:
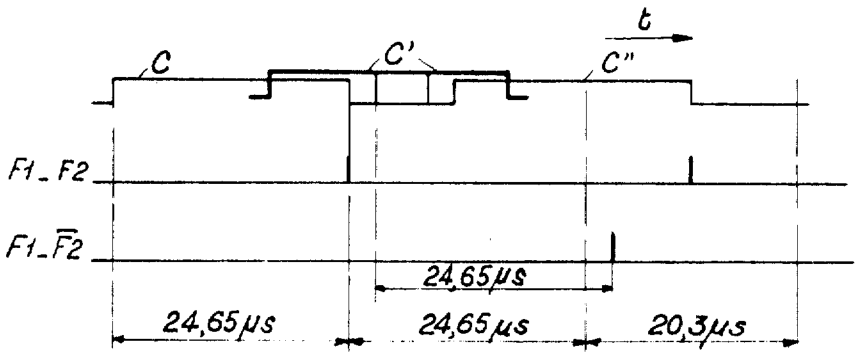

As illustrated in FIG. 14, it can happen that two separate, successive code groups C and C″ are both overlapped by a third intervening code group C′ which is in pulse-overlapping relation with both code groups C and C″. In such a situation, the circuitry described above as including AND-gate 90 and binary 91 will operate to tag a G label to the code group C; however, in this case it is also necessary to tag a garble label to the code group C″, since this code group (contrary to code group C′) will actually be extracted by the system and yet is garbled by the code group C′ ahead of it. The system described takes care of such a situation as follows.

AND-gate 4, on detecting the F1·F2 coincidence relating to code group C, clears the shift registers and arrests the input analysis as earlier described. The foreshortened, truncated code group constituting the part of code group C′ subsequent to code group C reactivates the Input Analyzer and is shifted through Shift Register 3 as also described earlier; in this case, however, the pulses of code group C also undergo this shifting process together with and after to the pulses of group C′. The $F1 \cdot \overline{F2}$ coincidence relating to group C′, sensed by gate 90 during the 20.30 μs. interval following the 24.65 μs. period after then sensing of the F1·F2 coincidence in code group C, causes the G label to be applied to Second Buffer Register 6, as earlier described, to tag the C code group stored in that register. Simultaneously, the output signal produced by gate 90 in response to said $F1 \cdot \overline{F2}$ coincidence of the C′ group sets binary 93, thereby enabling, through OR-gate 95, AND-gate 94. Hence, when coincidence gate 4 again senses an F1·F2 coincidence, this time in the C code group, AND-gate 94 will pass the output signal from gate 4 as a G signal which is entered into a specially provided stage of First Buffer Register 5 to tag the C″ code group, stored therein, as a garbled code group.

In the event that a code group stored in First Buffer Register 5 has been tagged with a garble label from gate 94 as just described, it is necessary to prevent the same code group from being re-labeled with a G signal from gate 90 while stored in the Second Buffer Register 6, since the two garble indications might cancel each other. To ensure this, there is provided the AND-gate 92 interposed in the connection from AND-gate 90 to the second register 6; gate 92 has a second input connected to the reset output of a binary 98, acting as an inhibitor, whose setting input is connected to that one of the transfer gates 39 which, acting as a special transfer stage, serves to pass the G-bit from the First to the Second Buffer Register. The resetting input of binary 98 is connected to the output of AND-gate 4. Thus, if a G-bit was present in the First Buffer Register 5, binary 98 is set at the instant of parallel transfer of the contents of that register into register 6, and AND-gate 92 is prevented from subsequently passing the G-signal from gate 90 into said second register 6.

As earlier described, when a code group present in the Primary Channel is followed by another code group in interleaved relationship therewith, this second code group is directed by Input Analyzer 2 into the Secondary Channel. In such a situation, the code group in the Primary Channel must be labeled with a "garble" indication. For this purpose, the Garble Analyzer includes another switch in the form of a binary 96 having its setting input connected to the output of the Input Gate 29 which feeds the Secondary Channel. The binary 96 is reset through a delay network 97 by the output of coincidence gate 4. The set output of binary 96 is applied by way of the OR-gate 95 together with the output of binary 93 to the AND-gate 94 to enter a G signal into the First Buffer Register 5.

It will be seen from the foregoing description that the multipositional digital-code extractor system of the invention operates to extract useful, i.e. correctly decodable, code signals from the midst of other, garbling signals, in a number of situations which were heretofore considered hopeless when encountered in most conventional secondary-radar code extractors. The system will, further, deliver to the decoder unit associated with it a signal indicating whether or not the current code group is garbled. The total processing time is $2 \times 24.65 + 20.3 = 69.6$ μs. The system is relatively simple and its operation is very reliable. When our instant arrangement is compared to the more elaborate code extractor system disclosed in the co-pending application an patent identified hereinabove, it will be seen that major simplifications are made possible by the method of input analysis used in the present system, owing to the use herein of "phase-memory" pulses in the form of two distinct trains of sampling pulses of precisely determined width and timing whereby interleaved response code pulses can be directly segregated into the respective channels. This greatly simplifies the design of the input analysis unit as will be apparent from the disclosure. Other simplifications are present in the garbling analysis, by virtue *inter alia* of the fact that a code group that has been directed into the secondary channel is known ipso factor to be a garbled and garbling code. Furthermore, the provision of the two-stage buffer storage in each processing channel reduces the occupation time of the shift registers to a minimum, and permits said shift registers to be considerably shortened.

Various modifications may be introduced into the embodiment disclosed without the exercise of further invention. In particular the system may include more than the two processing channels of the type shown, and a corresponding number of sampling or phase-memory pulse trains such as E, E' may be generated in the Input Analyzer unit, which would be appropriately timed with respect to one another so as to direct more than two interleaved code groups into the respective channels. Also, certain of the teachings disclosed in the above-identified co-pending application and patent may be embodied in the present system, e.g. in the garble analyzer section thereof in order to specify the type of garbling involved. The invention, while developed for the handling of secondary-radar response signals of the type prescribed by current aeronautical regulations, can readily be modified to handle other types of information signal codes, not necessarily radar codes, wherein the number and the timing characteristics of the pulse positions may differ greatly from the numerical values included in the present specification for clarity of the disclosure.

Reference is also made to our commonly assigned co-pending application Ser. No. 498,829, filed Oct. 20, 1965, disclosing generally similar system with means for selectively directing incoming code pulses into a pair of parallel channels, depending upon their phasing as determined by a spike generator which produces two interleaved trains of spikes substantially coinciding with the leading and trailing edges, respectively, of a code group headed by an initially received code pulse.

What we claim is:

1. In a digital-code-extractor system having an input for receiving multiposition pulse codes, the combination comprising:

pulse-generator means responsive to the arrival of an initial code pulse at said input for producing a plurality of trains of equispaced sampling pulses with the pulses thereof in mutually interspersed relationship, the pulse-repetition period of each of said trains being equal to the pulse-position interval in a code group to be received, the sampling pulses of one of said trains being timed for substantial coincidence with the pulse positions of a code group headed by said initial pulse, the interspersed pulses of said trains following one another with a spacing less than the width of a code pulse;

test means connected to said input and to said pulse-generator means for detecting an at least partial coincidence of an incoming code pulse, following said initial pulse, with a sampling pulse from any of said trains;

circuitry forming a plurality of channels for the processing of pulse codes arriving substantially concurrently from different sources; and gating means controlled by said test means for directing code pulses at least partly coinciding with sampling pulses of said one of said trains into a first of said channels and for directing code pulses at least partly coinciding with sampling pulses of another of said trains into a corresponding other of said channels.

2. The combination defined in claim 1 wherein said pulse-generator means comprises a digital counter, a source of clock pulses having a recurrence rate substantially higher than the frequency of said sampling pulses in each of said trains, and control means triggerable by said initial pulse for feeding clock pulses from said source to said counter, the latter having an operating cycle equaling the pulse-repetition period of said trains.

3. The combination defined in claim 2 wherein each of said channels includes a respective shift register with a number of stages corresponding to the number of pulses in a code group, further comprising a network controlled by said counter for generating shifting pulses for said shift registers.

4. The combination defined in claim 3 wherein said gating means comprises a first AND-gate connected to said input and to a first output of said network carrying said one of said trains of sampling pulses, and a second AND-gate connected to said input and to a second output of said network carrying another train of said sampling pulses.

5. The combination defined in claim 2 wherein said source has two outputs carrying two relatively staggered trains of said clock pulses, said control means including a flip-flop, a first gate connected to be enabled by said initial pulse to pass a clock pulse from one of said outputs to said flip-flop for setting same, and a second gate connected to be enabled by said flip-flop in the set condition thereof for passing clock pulses from the other of said outputs to said counter.

6. The comibnation defined in claim 1 wherein said gating means includes a binary element with a first state enabling transmission of incoming code pulses to said first of said channels and a second state blocking such transmission, and presetting means for initially maintaining said binary element in said first state, while stopping said pulse-generator means.

7. The combination defined in claim 6, further comprising resetting means controlled by said pulse-generator means for restoring said binary element to said second state within a fraction of the pulse-repetition period of said trains.

8. The combination defined in claim 7 wherein said first of said channels includes a digital shift register with a number of stages corresponding to the number of pulse positions in a code group, coincidence means connected to a combination of outputs of certain of said stages to determine the concurrent presence of pulses therein, and stop means for generating a command signal to set said binary element to its first state and to clear said shift register under the control of said coincidence means in the presence of a predetermined combination of pulses in any of said channels, with concurrent deactivation of said pulse-generator means.

9. The combination defined in claim 8 wherein said coincidence means comprises a first logical gate connected to detect the presence of a pair of framing pulses at the beginning and the end of a code group, said other of said channels including a digital shift register substantially identical with that of said first of said channels, each of said channels further including a second logical gate connected to detect the presence of any pulse stored in the associated shift register, said stop means being responsive to an output signal from said first logical gate coinciding with an output from said second logical gate in said other of said channels to apply said command signal to the shift registers of both said channels for clearing same in the presence of a complete code group in said first of said channels and in the simultaneous absence of any code pulse in said other of said channels.

10. The combination defined in claim 9 wherein said stop means is connected to respond to concurrent output signals from said second logical gates of both said channels for generating said command signal.

11. The combination defined in claim 1, further including garble-analyzing means responsive to said test means for generating a garbling signal in the presence of a code pulse in said other of said channels.

12. The combination defined in claim 11 wherein said first of said channels includes register means for storing the pulses of a code group, further comprising circuit means connected to said garble-analyzing means for entering said garbling signal in said register means for joint storage with said code group.

13. In a digital-code-extractor system having an input for receiving multiposition pulse codes, the combination comprising:

phase-testing means responsive to the arrival of an initial code pulse at said input for measuring the spacing of subsequent code pulses from said initial pulse to determine whether such subsequent pulse is part of a code group headed by said initial code pulse;

register means for storing pulses of a code group under the control of said phase-testing means;

garble-analyzing means responsive to said phase-testing means for generating a garbling signal in the presence of a code pulse foreign to the code group stored in said register means;

and circuit means connected to said garble-analyzing means for entering said garbling signal in said register means for joint storage with said code group.

14. The combination defined in claim 13 wherein said register means includes a digital shift register with a number of stages corresponding to the number of pulses in a code group and memory means connected to receive a code group from said shift register, said circuit means being connected to said memory means for delivering said garbling signal thereto.

15. The combination defined in claim 14 wherein said circuit means includes a first coincidence gate connected to a combination of stage outputs of said shift register to determine the concurrent presence of pulses therein indicative of the registration of a complete code group and timer means controlled by said first coincidence gate for measuring an interval substantially corresponding to the length of a code group, said garble-analyzing means comprising switch means operable by said timer means and a second coincidence gate connected to another combination of stage outputs of said shift register and to said switch means for generating said garbling signal in the presence of an incomplete code group in said shift register during said interval.

16. The combination defined in claim 11 wherein said garble-analyzing means further comprises other switch means operable by said phase-testing means in response to an incoming pulse foreign to said code group, said circuit means including a third coincidence gate connected to said other switch means and to said first coincidence gate for generating said garbling signal in the presence of a complete code group in said shift register simultaneously with the arrival of such foreign pulse.

17. In a digital-code-extractor system having an input for receiving multiposition pulse codes, the combination comprising:

circuitry forming a first and a second channel for the processing of pulse codes arriving substantially concurrently from different sources;

phase-testing means responsive to the arrival of an initial code pulse at said input for measuring the spacing of subsequent code pulses from said initial pulse to determine whether such subsequent pulse is part of a code group headed by said initial code pulse;

gating means controlled by said phase-testing means for directing pulses of a common code group into said first channel and for directing other incoming pulses into said second channel;

register means in said first channel including a first memory section and a second memory section for the concurrent storage of two consecutive code groups, said register means further including a multistage register preceding said first memory section and provided with a number of stages corresponding to the number of pulse positions in a code group;

sensing means connected to a combination of outputs of certain of said stages to determine the concurrent presence of pulses therein indicative of the registration of a complete code group;

first transfer means responsive to said sensing means for transferring a first code group from said multistage register to said first memory section;

second transfer means for transferring said first code group from said first memory section to said second memory section preparatorily to transfer of a second code group to said first memory section;

timer means operable by said sensing means for actuating said second transfer means a predetermined period after detection of said first code group in said multistage register;

garble-analyzing means responsive to said phase-testing means for generating a garbling signal in the presence of at least one code pulse in said second channel; and circuit means connected to said sensing means and to said garble-analyzing means for entering said garbling signal in each of said memory sections for joint storage with respective code groups.

18. The combination defined in claim 17 wherein said second transfer means includes a special stage for transferring said garbling signal from said first to said second memory section, said circuit means further comprising inhibitor means connected to said special stage for preventing a re-entry of said garbling signal into said second memory section upon transfer of such garbling signal from said first memory section.

19. The combination defined in claim 17 wherein said garble-analyzing means comprises switch means operable by said timer means and a coincidence gate connected to another code combination of stage outputs of said multistage register and to said switch means for generating said garbling signal in the presence of an incomplete code group in said multistage register during an interval starting with detection of a complete code group in said multistage register, said interval corresponding substantially to the length of such code group.

References Cited

UNITED STATES PATENTS

| | | | |
|---|---|---|---|
| 3,390,283 | 6/1968 | Hannigsberg | 307—232 |
| 3,327,227 | 6/1967 | Sykes et al. | 328—137 |
| 3,235,661 | 2/1966 | Oxley et al. | 340—172.5 |
| 3,103,632 | 9/1963 | Kaiser | 328—137 |
| 3,058,104 | 10/1962 | Garfinkel et al. | 343—6.5 |
| 2,656,524 | 10/1953 | Gridley et al. | 340—172.5 |

GARETH D. SHAW, Primary Examiner

U.S. Cl. X.R.

307—232, 241; 328—137; 343—6.5